Patented Oct. 10, 1933

1,929,521

UNITED STATES PATENT OFFICE 1,929,521

ALKALI-METAL TITANATE AND METHOD OF MAKING SAME

Lonnie W. Ryan, Merrick, and Johan Richard Knoff, Brooklyn, N. Y., assignors to Titanium Pigment Company, Inc., New York, N. Y., a corporation of Maine No Drawing. Application October 16, 1931
Serial No. 569,264

19 Claims. (Cl. 23—202)

Our invention relates to the recovery of titanium compounds from titanium minerals, particularly from the titanium oxide mineral rutile, and also from artificially prepared and by-product titanium oxide and the like, such as hydrated titanium oxide. Our invention comprises, among other things, the formation of an alkali-metal titanate having the chemical composition $M_2Ti_5O_{11}$, in which "M" represents any alkali metal. Throughout this specification and claims where "M" occurs in a formula, it is understood that "M" represents any alkali metal, preferably sodium or potassium.

Ilmenite consisting principally of titanium and iron and corresponding substantially in composition as determined by chemical analysis to an iron titanate, ($FeTiO_3$) is the most common of the titanium ores. In commercial practice it is now usually, if not always, digested directly with sulphuric acid without any preliminary chemical treatment, whereby water soluble iron and titanium sulphates are formed. Rutile and other titanium oxide minerals as well as certain artificially prepared or by-product titanium oxides are not readily decomposed by sulphuric acid.

One of the earliest methods used for the decomposition of rutile and similar titanium ores or products, for example bauxite residues containing titanium, consisted in fusing the ore with alkali-metal alkaline compounds such as soda ash (sodium carbonate), or caustic soda (sodium hydroxide). Later a similar decomposition reaction was caused to take place by fusion with sodium sulphide. In so operating the sodium sulphide was sometimes added as such, and was sometimes formed in the reaction vessel by reduction of sodium sulphate with carbon. These later adaptations were used particularly with ilmenite. The titanium compound resulting from such treatments was the sodium titanate, ($Na_2TiO_3$), the alkali-metal compound always having been used in sufficient quantity to form this titanate or in excess.

After conversion to sodium titanate ($Na_2TiO_3$), if ilmenite ore was used, a mechanical separation was sometimes made of the iron compounds from the sodium titanate, depending upon differences in gravity between the molten titanium and iron compounds. If rutile, which contains only a relatively small percentage of iron, was the starting material, no mechanical separation of the constituents of the molten mass was necessary.

After such decomposition, the sodium titanate was usually treated with water or dilute acid in order to remove not only any excess of the alkali-metal compound employed but also soluble compounds of alalkali metal formed by hydrolysis or other reaction from the sodium titanate and the water or weak acid. Such procedures have been described in U. S. Patents Nos. 1,206,796 and 1,206,797 of December 5, 1916, 1,106,406 and 1,106,407 of August 11, 1914, 1,171,542 of February 15, 1916, and 1,166,547, of January 4, 1916.

A still later development described in U. S. Patent 1,697,929 of January 8, 1929, granted to one of us, was the discovery that hydrated titanium oxide could be converted to an alkali-metal titanate at a low temperature.

In the general literature on titanium there have been described alkali-metal titanates corresponding in compositions, among others, to $M_2TiO_3$ and $M_2Ti_3O_7$.

We have now discovered that an alkali-metal titanate containing less alkali metal in combination than has hitherto been described can be prepared by heating titanium compounds with the proper proportions of alkali-metal alkaline compounds, and that this new alkali-metal titanate is of commercial importance as an intermediate product in the recovery of titanium compounds from rutile and other titanium ores, and also from artificially prepared or by-product titanium oxide and the like. We have furthermore discovered that a reaction resulting in the same new compound may be caused to take place with a substantially neutral normal salt of an alkali metal, such as for example, sodium sulphate, and also with an acid salt of an alkali metal, such as for example, sodium bisulphate.

A series of reactions caused to take place by us under many varying conditions between alkali-metal compounds and rutile in molecular proportions to form titanates corresponding to the following compositions, $M_2TiO_3$, $M_2Ti_2O_5$, $M_2Ti_3O_7$, $M_2Ti_4O_9$, $M_2Ti_5O_{11}$, $M_2Ti_6O_{13}$, resulted only in the formation, as determined by X-ray analyses, of the three compounds corresponding in composition to $M_2TiO_3$, $M_2Ti_3O_7$ and $M_2Ti_5O_{11}$. Proportions to form $M_2Ti_2O_5$ resulted in a mixture of $M_2TiO_3$ and $M_2Ti_3O_7$. Proportions to form $M_2Ti_4O_9$ resulted in a mixture $M_2Ti_3O_7$ and $M_2Ti_5O_{11}$. Proportions to form $M_2Ti_6O_{13}$ resulted in a mixture of $M_2Ti_5O_{11}$ and undecomposed rutile.

Our investigations have determined that our new compound containing in chemical equivalents 2 parts of alkali metal and 5 parts of titanium, and corresponding in composition to $M_2Ti_5O_{11}$, of the titanates which it is possible to prepare, contains the most titanium and the least alkali metal. Our new compound, when pure and uncontaminated by iron and other similar elements, is white in color and is crystalline in structure. The specific gravity of the sodium compound is approximately 3.5. It is only slightly hydrolyzed by boiling water or boiling solutions of mineral acids. It is, however, readily attacked upon digestion at an elevated temperature with concentrated sulphuric acid, resulting in a mixture of titanium and alkali-metal sulphides, which are soluble in water.

Our invention comprises primarily the decomposition of titanium ores or titanium oxide or the like, with the formation of the alkali-metal titanate ($M_2Ti_5O_{11}$), and to the conversion of this product to a salt which is soluble in water. However, our invention in its broadest aspect relates to the new compound ($M_2Ti_5O_{11}$) and its formation from any titanium compound, which will result upon reaction with an alkali-metal compound, in its formation, and to the conversion of this new compound to a product which is soluble in water. The temperature for the formation of our new compound varies from below 800° C. to above 1000° C., depending upon the titanium product employed, its state of subdivision, and to the alkali-metal compound employed. The water-soluble product obtained upon digesting our new compound with sulphuric acid may be used according to known methods for the manufacture of pure titanium oxide, composite titanium pigments, titanium salts and other useful titanium products.

Having now described our invention we give five detailed examples for illustrative purposes, involving the use of five specific alkali-metal compounds. The invention is not to be limited, however, to the exact operating conditions described in the examples nor to the definite titanium and alkali-metal compounds described as being employed. While carbon in the form of charcoal is specified as being employed in Examples 3 and 5, it is to be understood that other forms of carbon such as coke, bituminous coal, etc., may be satisfactorily employed.

*Example 1:*—100 pounds of finely divided rutile is intimately mixed with 26.5 pounds of sodium carbonate ($Na_2CO_3$) and roasted for 1 hour at 950° C. The resulting product is mixed with 300 pounds of 93% sulphuric acid and digested for about 2 hours at a temperature of 200 to 220° C. To the resulting sulphates in a suitable container, are added about 1200 pounds of water. The mixture is then heated by injection of steam or otherwise to a temperature of about 80° C. and stirred until substantially complete solution takes place.

*Example 2:*—100 pounds of finely divided rutile is intimately mixed with 35.5 pounds of sodium sulphate ($Na_2SO_4$) and roasted for 3 hours at 1100° C. The resulting product is mixed with 360 pounds of 78% sulphuric acid and digested for about two hours at a temperature of 200 to 220° C. To the resulting sulphates in a suitable container, are added about 1200 pounds of water. The mixture is then heated by injection of steam or otherwise to a temperature of about 80° C. and stirred until substantially complete solution takes place.

*Example 3:*—100 pounds of finely divided rutile is intimately mixed with 60 pounds of nitre cake (sodium bisulphate) and 5 pounds of carbon in the form of charcoal and roasted for 1 hour at 950° C. The resulting product is mixed with 300 pounds of 93% sulphuric acid and digested for about 2 hours at a temperature of 200 to 220° C. To the resulting sulphates in a suitable container, are added about 1200 pounds of water. The mixture is then heated by injection of steam or otherwise to a temperature of about 80° C. and stirred until substantially complete solution takes place.

*Example 4:*—100 pounds of finely divided rutile is intimately mixed with 34.5 pounds of potassium carbonate ($K_2CO_3$) and roasted for 1 hour at 950° C. The resulting product is mixed with 300 pounds at 93% sulphuric acid and digested for about 2 hours at a temperature of 200 to 220° C. To the resulting sulphates in a suitable container, are added about 1200 pounds of water. The mixture is then heated by injection of steam or otherwise to a temperature of about 80° C. and stirred until substantially complete solution takes place.

*Example 5:*—100 pounds of finely divided rutile is intimately mixed with 44 pounds of potassium sulphate ($K_2SO_4$) and 5 pounds of carbon in the form of charcoal and rosted for 1 hour at 950° C. The resulting product is mixed with 300 pounds of 93% sulphuric acid and digested for about 2 hours at a temperature of 200 to 220° C. To the resulting sulphates in a suitable container, are added about 1200 pounds of water. The mixture is then heated by injection of steam or otherwise to a temperature of about 80° C. and stirred until substantially complete solution takes place.

We claim as our invention:

1. A method for decomposing titanium ores difficulty soluble in sulphuric acid which comprises heating said ores with an alkali-metal compound in amount approximately corresponding to the chemical equivalent of the metallic elements required to convert said ores into the acid-soluble alkali-metal titanate ($M_2Ti_5O_{11}$).

2. A method for decomposing titanium ores difficulty soluble in sulphuric acid which comprises heating said ores with an alkali-metal alkaline compound in amount approximately corresponding to the chemical equivalent of the metallic elements required to convert said ores into the acid-soluble alkali-metal titanate ($M_2Ti_5O_{11}$).

3. A method for decomposing titanium ores difficulty soluble in sulphuric acid which comprises heating said ores with an alkali-metal compound and carbon in amount approximately corresponding to the chemical equivalent of the metallic elements required to convert said ores into the acid-soluble alkali-metal titanate ($M_2Ti_5O_{11}$).

4. A method for decomposing titanium ores difficulty soluble in sulphuric acid which comprises heating said ores with sodium carbonate in amount approximately corresponding to the chemical equivalent of the metallic elements required to convert said ores into the acid-soluble sodium titanate ($Na_2Ti_5O_{11}$).

5. A method for decomposing titanium ores difficulty soluble in sulphuric acid which comprises heating said ores with sodium sulphate in amount approximately corresponding to the chemical equivalent of the metallic elements required to convert said ores into the acid-soluble sodium titanate ($Na_2Ti_5O_{11}$).

6. A method for decomposing titanium ores difficulty soluble in sulphuric acid which comprises heating said ores with sodium bisulphate in amount approximately corresponding to the chemical equivalent of the metallic elements required to convert said ores into the acid-soluble sodium titanate ($Na_2Ti_5O_{11}$).

7. A method for decomposing titanium ores difficulty soluble in sulphuric acid which comprises heating said ores with sodium sulphate and carbon in amount approximately corresponding to the chemical equivalent of the metallic elements required to convert said ores into the acid-soluble sodium titanate ($Na_2Ti_5O_{11}$).

8. A method for decomposing titanium ores difficulty soluble in sulphuric acid which comprises heating said ores with sodium bisulphate and carbon in amount approximately corresponding to the chemical equivalent of the metallic elements required to convert said ores into the acid-soluble sodium titanate ($Na_2Ti_5O_{11}$).

9. A method for decomposing titanium ores difficulty soluble in sulphuric acid which comprises heating said ores with potassium carbonate in amount approximately corresponding to the chemical equivalent of the metallic elements required to convert said ores into the acid-soluble potassium titanate ($K_2Ti_5O_{11}$).

10. A method for decomposing titanium ores difficultly soluble in sulphuric acid which comprises heating said ores with potassium sulphate and carbon in amount approximately corresponding to the chemical equivalent of the metallic elements required to convert said ores into the acid-soluble potassium titanate ($K_2Ti_5O_{11}$).

11. A method for decomposing titanium compounds difficultly soluble in sulphuric acid which comprises heating said compounds with an alkali-metal compound in amount approximately corresponding to the chemical equivalent of the metallic elements required to convert said ores into the acid-soluble alkali-metal titanate ($M_2Ti_5O_{11}$).

12. A method for decomposing titanium oxide which comprises heating said titanium oxide with an alkali-metal compound in amount approximately corresponding to the chemical equivalent of the metallic elements required to convert said ores into the acid-soluble alkali-metal titanate ($M_2Ti_5O_{11}$).

13. A method of making water-soluble titanium compounds which comprises heating a titanium compound difficulty soluble in sulphuric acid with an alkali-metal compound in amount approximately corresponding to the chemical equivalent of the metallic elements required to convert said ores into the acid-soluble alkali-metal titanate ($M_2Ti_5O_{11}$), and treating the resulting alkali-metal titanate with sulphuric acid.

14. A method of making water-soluble titanium compounds which comprises heating a titanium compound difficultly soluble in sulphuric acid with an alkali-metal compound and carbon in amount approximately corresponding to the chemical equivalent of the metallic elements required to convert said ores into the acid-soluble alkali-metal titanate ($M_2Ti_5O_{11}$), and treating the resulting alkali-metal titanate with sulphuric acid.

15. A method of decomposing rutile which comprises melting said substance with an alkali-metal compound restricted in amount approximately corresponding to the chemical equivalent of the metallic elements required to convert said rutile into the acid-soluble alkali-metal titanate ($M_2Ti_5O_{11}$).

16. A method of decomposing rutile which comprises melting said substance with sodium carbonate restricted in amount approximately corresponding to the chemical equivalent of the metallic elements required to convert said rutile into the acid-soluble sodium titanate ($Na_2Ti_5O_{11}$).

17. A method of decomposing rutile which comprises melting said substance with sodium sulphate restricted in amount approximately corresponding to the chemical equivalent of the metallic elements required to convert said rutile into the acid-soluble sodium titanate ($Na_2Ti_5O_{11}$).

18. A method of decomposing rutile which comprises melting said substance with sodium bisulphate restricted in amount approximately corresponding to the chemical equivalent of the metallic elements required to convert said rutile into the acid-soluble sodium titanate ($Na_2Ti_5O_{11}$).

19. A method of decomposing rutile which comprises melting said substance with potassium carbonate restricted in amount approximately corresponding to the chemical equivalent of the metallic elements required to convert said rutile into the acid-soluble potassium titanate ($K_2Ti_5O_{11}$).

LONNIE W. RYAN.
JOHAN RICHARD KNOFF.